US008501479B2

(12) United States Patent
Smith et al.

(10) Patent No.: US 8,501,479 B2
(45) Date of Patent: Aug. 6, 2013

(54) ROULETTE SIDE BET GAME

(76) Inventors: Ray Smith, Linden, NJ (US); Amanda Tears Smith, Linden, NJ (US)

( * ) Notice: Subject to any disclaimer, the term of this patent is extended or adjusted under 35 U.S.C. 154(b) by 47 days.

(21) Appl. No.: 12/969,219

(22) Filed: Dec. 15, 2010

(65) Prior Publication Data

US 2012/0153571 A1 Jun. 21, 2012

(51) Int. Cl.
*A63F 13/00* (2006.01)

(52) U.S. Cl.
USPC .......................................... 436/17; 273/138.1

(58) Field of Classification Search
USPC ........................................ 273/138.1; 463/17
See application file for complete search history.

(56) References Cited

U.S. PATENT DOCUMENTS

| | | | | |
|---|---|---|---|---|
| 6,769,693 | B2 * | 8/2004 | Huard et al. | 273/274 |
| 7,204,488 | B2 * | 4/2007 | Ilievski | 273/143 R |
| 2004/0116179 | A1 * | 6/2004 | Nicely et al. | 463/25 |
| 2009/0042635 | A1 * | 2/2009 | Carbonaro | 463/17 |

* cited by examiner

*Primary Examiner* — Vishu K. Mendiratta
(74) *Attorney, Agent, or Firm* — Mark A. Litman and Associates, P.A.

(57) ABSTRACT

An apparatus and method of playing a side bet wager in a roulette game allow for a significant reward on the side bet. The side bet is on the appearance of three consecutive events where the number provided in the roulette game falls within three consecutively selected sets of numbers. The apparatus may be a standard roulette table with appropriate wager markings on the felt, a partially electronic table with wagering terminals and physical roulette wheel, or a completely electronic roulette table with virtual roulette wheel.

11 Claims, 2 Drawing Sheets

ROULETTE SIDE BET GAME

BACKGROUND OF THE ART

1. Field of the Invention

The present invention relates to the field of gaming, particularly casino gaming using a roulette system, and more particularly to a side bet wager and game used in conjunction with play at an electronic or physical roulette station.

2. Background of the Art

Roulette is a well-known game of chance enjoyed throughout the world. The equipment used for playing roulette generally comprises a roulette wheel and a game surface.

The roulette wheel generally comprises a horizontally disposed wheel mounted in a bowl-shaped housing. The wheel is adapted to rotate about a vertical axis and includes a plurality of pockets disposed around its periphery. Each pocket has a unique number associated with the pocket, as well as a color associated therewith. Each pocket is adapted to receive a small ball, which is introduced into the bowl-shaped housing by an operator or croupier as the wheel is set in motion. The wheel is typically spun in one direction and the ball projected around the circumference of the housing in an opposite direction. As the ball loses speed, it rolls down the concave housing wall, eventually coming to rest in one of the pockets. The outcome or result of the spin is the number and color associated with the pocket in which the ball comes to rest.

The game surface includes a plurality of wagering areas indicating various numbers, colors, parities (the odd or even quality of a number) and groupings of numbers. One or more players make wagers on a predicted outcome of a spin of the roulette wheel. A players indicates his or her wager by placing one or more wagering devices, such as chips or markers representing an amount of the wager, at a predetermined location on the game surface corresponding to a predicted outcome of a spin of the roulette wheel. There are several types of wagers possible in the traditional Roulette game. For example, one may place a wager on a single number, or two numbers (by placing your chip so it straddles the line on the game board surface between any two numbers). There are red, black, odd and even bets, and, a "dozens" bet made on the 12 consecutive numbers where wagers are placed in boxes marked 1-12, 13-24 or 25-36, for example, for a 36 number roulette game.

In attempts to enhance the betting opportunities of the traditional Roulette game including a board game surface and roulette wheel, besides providing the ability to place traditional wagers, e.g., wager on a particular number by placing one or more chips or markers within the wagering area(s) corresponding to that number, or, wager on groupings of individual numbers, additional novel wagering areas have been proposed for additional "side betting."

For example, U.S. Pat. No. 5,540,442 describes a modified roulette game offering an additional betting opportunity. When a winning bet in the conventional layout is determined by the operation of the roulette wheel, a random number generator also generates and displays one of the conventional roulette numbers, i.e., 1-36, 0 or 00. If the number displayed by the random number generator is the same as the winning number that is determined by the roulette wheel spin outcome, the side bet on that number is an additional winning bet.

Published US Patent Document No. 20100164172 (Au-Yeung) describes a method of playing a game, including roulette using a gaming apparatus to generate one of a plurality of specified outcomes upon which a player of the game may place a bet upon that outcome occurring. The method has the steps of: a. providing a gaming apparatus capable of generating one of a plurality of specified outcomes; b. providing a layout having a plurality of betting areas corresponding to said specified outcomes generated by the gaming apparatus, whereby a player may place a bet on the outcome of a play of the gaming apparatus; c. providing a random generator device to produce one or more random events; d. providing a plurality of separate multi-choice random event betting areas corresponding to the random events produced by the random generator device, each separate multi-choice random event betting area being associated with one or more different betting areas corresponding to a specified outcome of the gaming machine, whereby a player may place a bet forecasting separately; the specified outcome generated by the gaming apparatus and a random event produced by the random generator device; e. allowing a player to place a bet on at least one on: a specified outcome generated by the gaming apparatus, and/or the specified outcome generated by the gaming apparatus and a random event of the random event generator device; f. playing the gaming apparatus and at the same time generating a random event via the random event generator device; g. determining whether a player has placed a winning bet; and h. paying on a winning bet.

Published US Patent Document No. 2008258383 describes a roulette game including a board game surface and roulette wheel, wherein besides the traditional roulette wheel wagering opportunities, an additional novel wagering area is provided for additional "side betting." That is, a side wagering area comprising ten individual wagering areas corresponding to a digit value 0, . . . , 9, is provided for the game board surface. A bettor may conduct a wager by placing a chip or marker on a particular digit value of the side wagering area for indicating a wager that a resulting digit of a one digit or two digit whole number roulette spin outcome will match that digit value being wagered. The payout odds for a winning side bet adheres to house advantages established for both American and European style roulette games.

Published US Patent Document No. 20090098921 (Manning et al.) describes apparatus having a computing device operable to: determine 21 symbols; cause the 21 symbols to be displayed in a grid pattern in which there are three rows with seven symbols per row, and seven columns with three symbols per column; determine a first outcome based on only a first subset of the 21 symbols, the first subset containing 15 symbols; determine a second outcome based on only a second subset of the 21 symbols, the second subset containing 15 symbols; determine a third outcome based on only a third subset of the 21 symbols, the third subset containing 15 symbols; and cause a payment to be provided to a player based on at least one of the first outcome, the second outcome, and the third outcome.

Published US Patent Document 20080006996 (Frankel) describes a method of playing a roulette game using the steps of: (a) establishing rules of play for a roulette game that may be played in a series of rounds, (b) affording a player an opportunity to make a primary wager on each round of the roulette game in accordance with the established rules of the roulette game, (c) establishing rules of play for a secondary wager to be played substantially concurrently with the roulette game wherein a chip is wagered, and the odds of receiving a favorable outcome of the secondary wager depend upon the current number of favorable outcomes of the secondary wager and the outcome of the secondary wager is determined independently of the outcome of the roulette game, wherein (i) if the outcome of the secondary wager is unfavorable, then the current number of favorable outcomes is set to an initial value and the chip is confiscated, (ii) if the outcome of the secondary wager is favorable, then the current number of favorable outcomes is incremented and the chip is either: (1) exchanged for an incremented chip which is used in a subsequent round of secondary wagering, or (2) surrendered for a payout which is dependent upon the current number of favorable outcomes and reinitializing the number of favorable outcomes, (d) affording a player an opportunity to make a secondary wager on a series of rounds of play of the roulette game, the player of the secondary wager selecting criteria of the secondary wager in accordance with the established rules of the secondary wager, (e) playing a series of rounds of the roulette game in accordance with the established rules, (f) determining if a secondary wager was made, wherein if the secondary wager was made, determining the outcome of the secondary wager.

Other forms of side bets in gaming systems that are shown to enhance a game of chance are listed below. To win the secondary wager one must often win a sequence of games in a row and thus qualify for a bonus jackpot. U.S. Pat. No. 5,042,810 to Williams (Roulette Apparatus) discloses a roulette wheel that includes such a bonus jackpot. The roulette apparatus of Williams may pay a bonus jackpot to the winner of the primary game (e.g. roulette) upon the occurrence of a specified condition (e.g. when a number occurs three times in a row). A similar game is taught in U.S. Pat. No. 5,593,161 to Boylan et al. (Wagering Game with a Set of Rounds and Bets) wherein a player makes a secondary wager on a predetermined number of rounds of a primary game. If the player wins all of the rounds, the player is rewarded with a bonus jackpot. Another roulette game with a bonus jackpot is disclosed in U.S. Pat. No. 5,743,798 to Adams et al. (Apparatus for Playing a Roulette Game Including a Progressive Jackpot). In each of the aforementioned games, if the player is to win the bonus jackpot, the player must also win the primary game. Thus, winning of the jackpot is dependent upon winning the primary game.

U.S. Pat. No. 5,048,833 to Lamie (Apparatus for Detecting a Series of Game Outcomes) teaches a similar method for accumulating a bonus jackpot. Lamie discloses a slot machine that determines the odds of successfully completing a number of hypothetical games. During play, if the actual outcome falls to match the hypothetical outcome, then the jackpot is increased. If the actual outcome meets the hypothetical outcome, then the bonus jackpot is paid out. Much like Williams, the player cannot win the bonus jackpot unless the player also wins the primary game.

U.S. Pat. No. RE38,982 (Gambling Game System and Methods) and U.S. Pat. No. 5,934,998 (Blackjack Game System and Methods), both to Forte et al., disclose multiple bonus jackpots that are paid out at certain frequencies—the larger the jackpot, the less frequently the payout is made. The bonus jackpots are paid out upon the occurrence of a certain condition, and the player does not make a secondary wager or choose the conditions to be wagered upon. The player is often detached from the wagering process, and as such the game is less enjoyable than a game with more player involvement.

U.S. Pat. No. 5,570,885 (Electronic Gaming System and Method for Multiple Play Wagering) and U.S. Pat. No. 5,718,431 (Gaming System and Method for Multiple Play Wagering), both to Ornstein, teach a method of placing a secondary wager on consecutive wins of a primary game. To win the secondary wager, the player must necessarily win the primary game. A similar wagering system is disclosed in U.S. Pat. No. 6,679,492 to Markowiak (Method of Playing a Better Game Using Special Payoff Tables) that uses special "win buttons" to track the number of consecutive wins. Markowiak's invention changes the house edge in each round of play to favor the player by increasing the payout. It is important to note that the chance of winning each individual round remains constant. Such an arrangement attempts to induce the player to continue betting. Unfortunately, this same arrangement also increases the chances that a player will strike a large jackpot, and thus reduces the casino's profit. Furthermore, like most of the prior art, to win the secondary wager the player must also win the primary game.

SUMMARY OF THE INVENTION

A method of play of a side bet game during play of multiple rounds of play of roulette, the method having steps including:

a) providing a roulette venue having a physical roulette system of a roulette wheel and roulette ball or a virtual roulette system having a processor and a video monitor;

b) the system allowing individual players to place wagers during an underlying roulette game;

c) the system allowing individual players to place a side bet amount of value as a wager on a side bet game having fixed rules;

d) the fixed rules of the side bet practiced as a method on the system including:

the system identifies the side bet;

the side bet is a wager on the occurrence of a first outcome on the underlying game of roulette wherein a number resulting in the fall of the roulette ball in the underlying game is a first number within a first group of numbers identified in the bet accepted by the system from an individual player, the system recognizing the wager as within a set of numbers on which the bet is identified, the set being at least two numbers and less than 6 numbers;

the system identifying whether the first number falls within a set of numbers on which a side bet has been accepted, wherein if the first number is within the set, allowing the side bet to remain active and continue towards a winning outcome that will be resolved, and if the first number is not within the set of numbers of a side bet that has been accepted, the system removing the side bet and ending any possibility of the side bet being resolved with a payout;

the system accepting a second set of numbers from a player as a continuation of the side bet in a second play of the underlying game of roulette, with a second dropping of the roulette ball into a roulette wheel;

the system causing another fall of the roulette ball and identification of the second number outcome of the fall of the roulette ball and identifying whether the second set of numbers for a player who's side bet is continuing to be active includes the second number outcome;

the system identifying whether the second number falls within a set of numbers on which a side bet has been accepted, wherein if the second number is within the set, allowing the side bet to remain active and continue towards a winning outcome that will be resolved, and if the second number is not within the set of numbers of a side bet that has been accepted, the system removing the side bet and ending any possibility of the side bet being resolved with a payout;

the system accepting a third set of numbers from a player as a continuation of the side bet in a third play of the underlying game of roulette, with a third dropping of the roulette ball into a roulette wheel; and the system causing another fall of the roulette ball and identification of the third number outcome of the fall of the roulette ball and identifying whether the third set of numbers for a player who's side bet is continuing to be active includes the third number outcome; and the system providing an award to a player who's three sets of numbers has each included a respective number provided by the drop of the roulette ball, the award being selected from the group consisting of a progressive jackpot award, a fixed price jackpot award, or a fixed multiple of the side bet amount of the side bet.

DETAILED DESCRIPTION OF THE INVENTION

It is to be noted at the outset that the present game may be played on a regular casino table roulette surface, with additional markings and/or additional game-pieces (markers, tokens, symbolic markers, special coins, special indicators, and the like) used to identify the progress of a wager and the side bet game on the table. It is easier, however, to use an electronic wagering system configured to play the method of the present invention using the rules of play described herein. Such electronic or partially electronic wagering systems are shown in such U.S. Patent Publications as US Published Patent Document 20060157928 (O'Halloran) which describes a method of operating a roulette game. The roulette game has betting means to allow players to select and place wagers on potential game outcomes. The method comprises the step of determining, after all the wagers have been made and before the outcome of the roulette game is known, whether a bonus trigger event has occurred. If a bonus trigger event is determined to have occurred, a bonus feature is provided.

Figure 1:
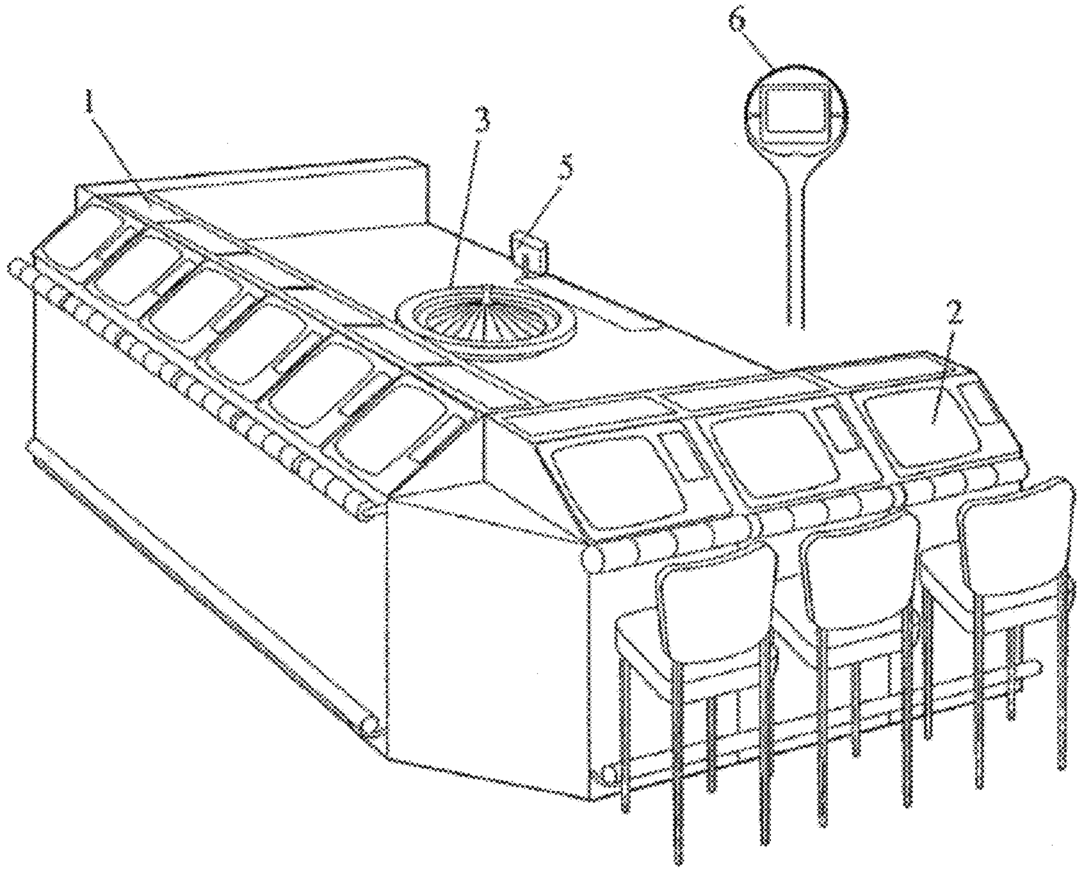
FIG. 1 shows an electronic table system capable of supporting play of the game described herein.

Also known in the art for a support system for using the technology of the present invention is US Published Patent Document 20040116177 (O'Halloran) which shows a gaming table in which the outcome of the game is determined manually, and in which players place bets electronically and wins or losses are calculated electronically. The gaming system is applicable to any suitable game including roulette. A game of the type described herein may be played on the system illustrated in FIG. 1 as well as other systems with the wagering format enabled for the wagering game described herein. A gaming table 1 includes a set of player terminals 2. The terminals allow each player to make bets and receive payouts, and optionally may provide other features such as history for the table. The dealer in this implementation may accept payments and then credit terminals. The dealer manually spins the wheel, to determine the game outcome, which is input via terminal 5. A display 6 shows the result of the game. Of course, it will be understood that the present invention could be implemented with fully automated wheels, fully electronic betting, or the like.

Further known in the art for a support system useful in the practice of the present technology is US Published Patent Document 20080113706 (O'Halloran) which discloses a wagering system for a wagering game uses at least one live random outcome game piece in the play of the wagering game. A gaming table is used with the at least one game piece to determine a random outcome. At least two player interface wagering systems with a visual display are provided on each player interface wagering system. Each player interface wagering system is in communication link with a game server that processes game data and determines wager outcomes. Each player interface wagering system has at least two selectable wagering input displays that may be separately selected and displayed by a player wagering at each player interface. Each of the at least two selectable wagering input displays identifies different sets of wagers that may be placed by the player on the random outcomes of the wagering game.

Every reference cited within this document is incorporated herein in its entirety to provide technical support and enablement for the support technology on which a game according to the present technology can be played.

Figure 2:
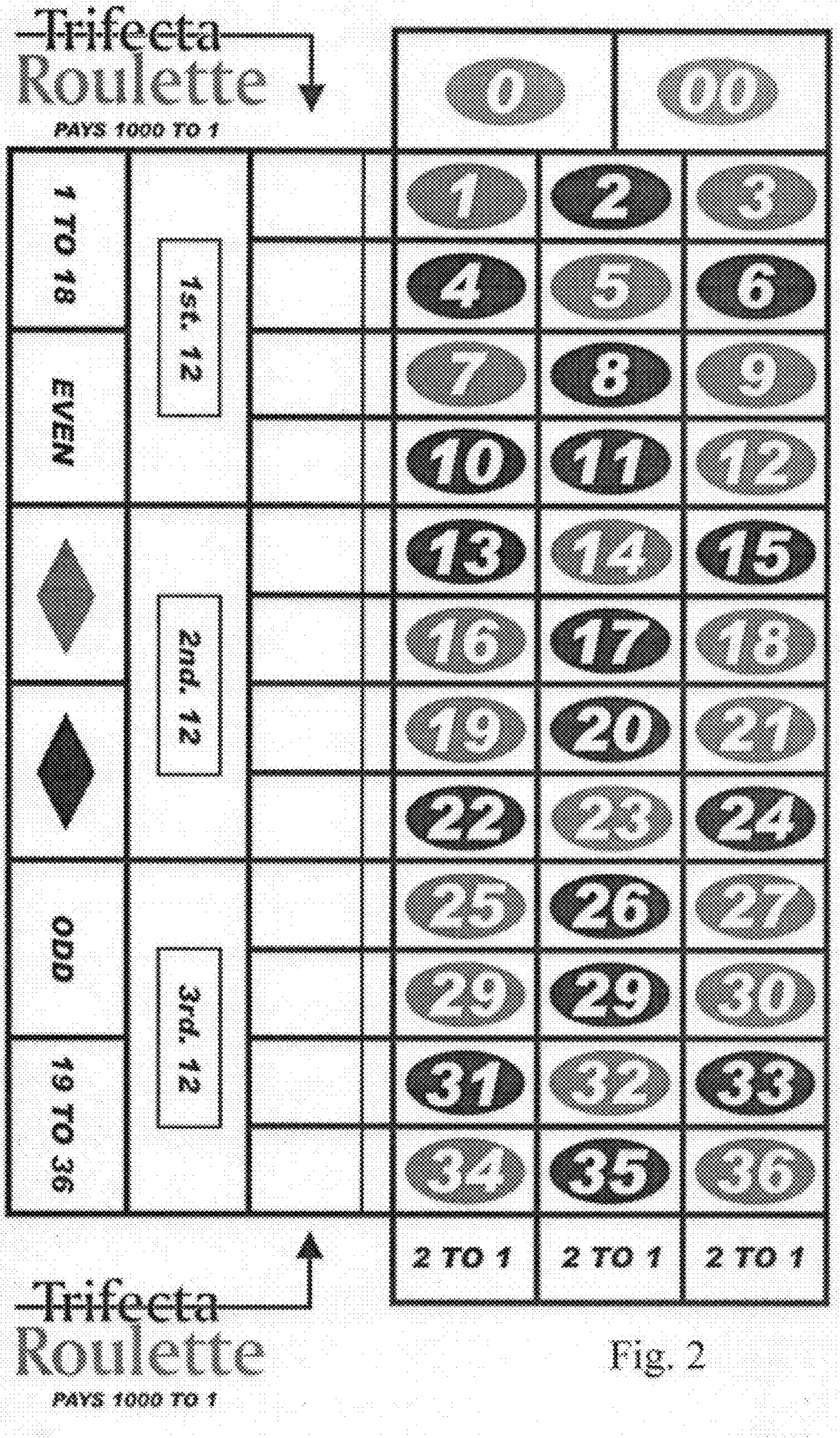
FIG. 2 shows a betting area provided with indicia useful in placing and identifying wagers on a physical roulette system adapted for play of the present game, referred to as the Trifecta Roulette™ game.

The present technology includes apparatus enabling or configured for a method of play of a side bet game during play of multiple rounds of play of roulette. The method may include at least steps including:

a) providing a roulette venue having a physical roulette system of a roulette wheel and roulette ball or a virtual roulette system having a processor and a video monitor;

The roulette venue may be a standard roulette table with additional wagering indicia on the felt, such as the simplified markings shown in FIG. 2. In that FIG. 2, the side bet wager is placed in the row 200 where the betting spaces are most easily provided adjacent standard sets of three (3) numbers as would be a typical three-number wager, such as a wager on 1, 2 and 3; 4, 5 or 6; . . . 27, 28 and 29; etc. The side bet wager, however, would be made in a different area or with a distinctly different wagering token to differentiate the side bet from the standard three-number wager. In an electronic venue, the multi-number side bet wager (e.g., preferably three-number side bet wager) may be individually selected, while the physical limits of a wagering table tends to physically limit the ability to place the side bet wagers and subsequent number selections to the natural three-number rows on the table. The processor can quickly recognize such number events without having to rely on physical linearity of the numbers.

b) the system allowing individual players to place wagers during an underlying roulette game;

The underlying wagers on the roulette game would be placed and resolved according to standard procedures, whether on a physical or electronic table.

c) the system allowing individual players to place a side bet amount of value as a wager on a side bet game having fixed rules;

The house (e.g., casino, croupier, etc.) would accept wagers placed on the side bet and be certain that the positioning of physical wagers is accurate and that the amounts placed on the side bet are within the casino allowed range of minimum and maximum wagers on that particular side bet. Electronic systems can be programmed and configured to assure proper wagers have been placed.

d) the fixed rules of the side bet practiced as a method on the system including:

the system identifies the side bet; In this case, the side bet is that in a first spin and drop of a ball, the revealed roulette number is one of the numbers in the set of numbers selected by the player and accepted by the system, and which allows play of the game in the side bet to continue.

the side bet is a wager on the occurrence of a first outcome on the underlying game of roulette wherein a number resulting in the fall of the roulette ball in the underlying game is a first number within a first group of numbers (e.g., at least two numbers, exactly three numbers, exactly four numbers, up to exactly five numbers) identified in the bet accepted by the system from an individual player, the system recognizing the wager as identifying a set of numbers on which the bet is identified, the set being at least two numbers (e.g., 2, 3, 4, or 5 numbers) and no more than 5 numbers; The return on the eventual side bet resolution would be adjusted based on how many numbers were in the identified set on which the side bet was made. Each continuing step in the side bet progression may have the same numbers or same number of numbers in each set, or may allow for fewer or greater numbers in each progressive step in the play of the side bet game.

the system identifying whether the first number falls within a set of numbers on which a side bet has been accepted, wherein if the first number is within the set, allowing the side bet to remain active and continue towards a winning outcome that will be resolved, and if the first number is not within the set of numbers of a side bet that has been accepted, the system removing the side bet and ending any possibility of the side bet being resolved with a payout; When the first roulette event allows the side bet wager to continue, the side bet wager on a physical table may be marked (e.g., an identifying game piece, such as a colored no-value token or statuette may be placed over the wager to indicate that the wager is now in a second round of events in the side bet game.

the system accepting a second set of numbers (the numbers in the second set may be the same or different numbers, usually a similar amount of numbers) from a player as a continuation of the side bet in a second play of the underlying game of roulette, with a second dropping of the roulette ball into a roulette wheel;

the system causing another fall of the roulette ball and identification of the second number outcome of the fall of the roulette ball and identifying whether the second set of numbers for a player who's side bet is continuing to be active includes the second number outcome; When the second roulette event allows the side bet wager to continue, the side bet wager on a physical table may be marked (e.g., a second identifying game piece, such as a second and different colored no-value token or statuette may be placed over the wager to indicate that the wager is now in a third round of events in the side bet game.

the system identifying whether the second number falls within a set of numbers on which a side bet has been accepted, wherein if the second number is within the set, allowing the side bet to remain active and continue towards a winning outcome that will be resolved, and if the second number is not within the set of numbers of a side bet that has been accepted, the system removing the side bet and ending any possibility of the side bet being resolved with a payout;

the system accepting a third set of numbers from a player as a continuation of the side bet in a third play of the underlying game of roulette, with a third dropping of the roulette ball into a roulette wheel; and the system causing another fall of the roulette ball and identification of the third number outcome of the fall of the roulette ball and identifying whether the third set of numbers for a player who's side bet is continuing to be active includes the third number outcome; and the system providing an award to a player who's three sets of numbers has each included a respective number provided by the drop of the roulette ball, the award being selected from the group consisting of a progressive jackpot award, a fixed price jackpot award, or a fixed multiple of the side bet amount of the side bet.

A gaming table 1 includes a set of player terminals 2. The terminals allow each player to make bets and receive payouts, and optionally may provide other features such as history for the table. The dealer in this implementation may accept payments and then credit terminals. The dealer manually spins the wheel, to determine the game outcome, which is input via terminal 5. A display 6 shows the result of the game. Of course, it will be understood that the present invention could be implemented with fully automated wheels, fully electronic betting, or the like.

What is claimed:

1. A method of play of a side bet game during play of multiple rounds of play of roulette, the method comprising:

a) providing a roulette venue having a physical roulette system of a roulette wheel and roulette ball and a wagering system comprising player input terminals and video monitors, the player input terminals being in communication link with a processor;

b) the system allowing individual player input terminals to have wagers recognized by the processor during an underlying roulette game;

c) the system allowing individual player terminals to have the processor recognize a wager of a side bet amount of value as a wager on a side bet game having fixed rules;

d) the fixed rules of the side bet practiced as a method on the system including all steps of:

i) the side bet is a wager on the occurrence of a first outcome on the underlying game of roulette wherein a number resulting in the fall of the roulette ball in the underlying game is a first number within a first group of numbers identified in the bet accepted by the processor from an individual player terminal, ii) the system recognizing the wager as within a the first set of numbers on which the bet is identified, the set being at least two numbers and less than 6 numbers;

iii) the system identifying whether the first number falls within the first set of numbers on which a side bet has been accepted, wherein:

1) if the first number is within the first set of numbers, allowing the side bet to remain active and continue towards a winning outcome that will be resolved, and 2) if the first number is not within the first set of numbers of a side bet that has been accepted, the processor removing the side bet and ending any possibility of the side bet being resolved with a payout;

iv) upon the occurrence of iii) 1), the processor accepting a second set of numbers different from the first set of numbers from a player input terminal as a continuation of the side bet in a second play of the underlying game of roulette, with a second dropping of the roulette ball into a roulette wheel;

v) the system causing another fall of the roulette ball and identification of the second number outcome of the fall of the roulette ball and the processor identifying whether the second set of numbers from a player input terminal who's side bet is continuing to be active includes the second number outcome;

vi) the processor identifying whether the second number falls within a set of numbers on which a side bet has been accepted from a player input terminal, wherein 1) if the second number is within the set, the processor allowing the side bet to remain active and continue towards a winning outcome that will be resolved, and 2) if the second number is not within the set of numbers of a side bet that has been accepted, the processor removing the side bet and ending any possibility of the side bet being resolved with a payout;

vii) upon the occurrence of vi) 1), the processor accepting a third set of numbers different from the second set of numbers from a player input terminal as a continuation of the side bet in a third play of the underlying game of roulette, with a third dropping of the roulette ball into a roulette wheel; and viii) the system causing another fall of the roulette ball and identification of the third number outcome of the fall of the roulette ball and the processor identifying whether the third set of numbers from a player input terminal which side bet is continuing to be active includes the third number outcome; and the system providing an award to a player input terminal who's three sets of numbers has each included a respective number provided by the drop of the roulette ball, the award being selected from the group consisting of a progressive jackpot award, a fixed price jackpot award, or a fixed multiple of the side bet amount of the side bet.

2. The method of claim 1 wherein each of the first set of numbers, the second set of numbers and the third set of numbers consists of exactly three numbers.

3. The method of claim 2 wherein after the first drop of a roulette ball indicates that a number within the first set is matched, a visually differentiating indicator is provided on the side bet wager when it is positioned on the second set of numbers.

4. The method of claim 3 wherein after the second drop of a roulette ball indicates that a number within the second set is matched, a visually differentiating indicator is provided on the side bet wager when it is positioned on the third set of numbers than was on the side bet wager when positioned for selecting the second set of numbers.

5. The method of claim 1 wherein the first set, the second set and the third set consist of the same number of numbers in the roulette field of play.

6. The method of claim 2 wherein the first set, the second set and the third set consist of all different numbers in the roulette field of play.

7. The method of claim 6 wherein after the first drop of a roulette ball indicates that a number within the first set is matched, a visually differentiating indicator is provided on the side bet wager when it is positioned on the second set of numbers.

8. The method of claim 7 wherein after the second drop of roulette ball indicates that a number within the second set of numbers is matched, a visually differentiating indicator is provided on the side bet wager when it is positioned on the third set of numbers than was on the side bet wager when positioned for selecting the second set of numbers.

9. The method of claim 1 wherein after the first drop of a roulette ball indicates that a number within the first set is matched, a visually differentiating indicator is provided on the side bet wager when it is positioned on the second set of numbers.

10. The method of claim 9 wherein after the second drop of a roulette ball indicates that a number within the second set is matched, a visually differentiating indicator is provided on the side bet wager when it is positioned on the third set of numbers than was on the side bet wager when positioned for selecting the second set of numbers.

11. A method of play of a side bet game during play of multiple rounds of play of roulette, the method comprising: a) providing an electronic roulette venue having a processor, random number generator and display screen as a virtual roulette system; b) the system allowing individual players to place wagers during an underlying roulette game on the virtual roulette system; c) the system allowing individual players to place a side bet amount of value as a wager on a side bet game having fixed rules; d) the fixed rules of the side bet practiced as a method on the system including: the processor in the system identifies the side bet; the side bet is a wager on the occurrence of a first outcome on the underlying virtual game of roulette wherein a number resulting in the virtual fall of the virtual roulette ball in the underlying game is a first number within a first group of numbers identified in the bet accepted by the system from an individual player, the system recognizing the wager as within a first set of numbers on which the bet is identified, the set being at least two numbers and less than 6 numbers; the system identifying whether the first number falls within the first set of numbers on which a side bet has been accepted, wherein:

i) if the first number is within the first set of numbers, the processor allowing the side bet to remain active and continue towards a winning outcome that will be resolved by the processor, and ii) if the first number is not within the set of numbers of a side bet that has been accepted, the processor in the system removing the side bet and ending any possibility of the side bet being resolved with a payout;

wherein upon the occurrence of i), the processor in the system accepting a second set of numbers different from the first set of numbers from a player as a continuation of the side bet in a second play of the underlying virtual game of roulette, with a second virtual dropping of the roulette ball into a virtual roulette wheel; the system causing another virtual fall of the virtual roulette ball and identification of the second number outcome of the fall of the virtual roulette ball and the processor identifying whether the second set of numbers for a player who's side bet is continuing to be active includes the second number outcome; the processor of the system identifying whether the second number falls within a set of numbers on which a side bet has been accepted, wherein:

iii) if the second number is within the set, the processor allowing the side bet to remain active and continue towards a winning outcome that will be resolved, and iv) if the second number is not within the set of numbers of a side bet that has been accepted, the processor in the system removing the side bet and ending any possibility of the side bet being resolved with a payout;

wherein upon the occurrence of iv), the processor in the system accepting a third set of numbers different from the first set of numbers from a player as a continuation of the side bet in a third play of the underlying game of roulette, with a third virtual dropping of the virtual roulette ball into a virtual roulette wheel; and the processor of the system causing another fall of the virtual roulette ball and identification of the third number outcome of the fall of the roulette ball and identifying whether the third set of numbers for a player who's side bet is continuing to be active includes the third number outcome; and the system providing an award to a player who's three sets of numbers has each included a respective number provided by the drop of the virtual roulette ball, the award being selected from the group consisting of a progressive jackpot award, a fixed price jackpot award, or a fixed multiple of the side bet amount of the side bet.

* * * * *